United States Patent Office 3,074,953
Patented Jan. 22, 1963

3,074,953
5-(3'-(4 - PHENYL - 4 - CARBETHOXY PIPERIDINO)-PROPYLIDENE) DIBENZO (a,d) (1,4) CYCLOHEPTADIENE
Martin A. Davis and Stanley O. Winthrop, Montreal, Quebec, Canada, assignors to American Home Products Corporation, New York, N.Y., a corporation of Delaware
No Drawing. Filed Jan. 17, 1962, Ser. No. 166,922
4 Claims. (Cl. 260—294.3)

This invention relates to a basically substituted derivative of cycloheptadiene and to its acid addition salts with pharmacologically acceptable acids.

More specifically, this invention relates to the new chemical compound, 5-[3'-(4-phenyl-4-carbethoxypiperidino)propylidene]dibenzo[a,d][1,4]cycloheptadiene, and to its acid addition salts with pharmacologically acceptable acids as, for example, the hydrohalide salts. It is also directed to a process by which these new compounds may be prepared from available starting materials.

The new dibenzocycloheptadiene derivative, especially in the form of its salts with pharmacologically acceptable acids, is characterized by properties representative of antidepressants. It has marked effects on the potentiation of alcohol hypnosis and in the diminution of spontaneous motility. This compound and its salts with pharmacologically acceptable acids are effective in the conditioned runway response test at doses which are substantially lower than those required to produce ataxia.

The new chemical compounds are further characterized by the substantial absence of mydriatic effects, thus indicating the absence of atropine-like side-effects. The latter effects are known to be undesirable in psychotropic drugs, the medical field in which these new chemical compounds are of value. It is also noteworthy that the new cycloheptadiene derivative, either in base form, or in the form of its salts with pharmacologically acceptable acids, does not possess analgetic activity and may be presumed to be free of narcotic or opiate-like activity.

In preparing the new chemical compound 5-[3'-(4-phenyl-4-carbethoxypiperidino)propylidene]dibenzo[a,d][1,4]cycloheptadiene, we prefer to start with the known chemical compound 5 - (3'- bromopyropylidene)dibenzo[a,d][1,4]cycloheptadiene. One method for the preparation of this know compound is disclosed in our co-pending patent application Ser. No. 157,262, filed December 5, 1961, entitled "Process for Preparing Dibenzocycloheptadiene Derivatives." As therein disclosed, it is readily prepared starting with 3-benzyloxypropyl bromide and dibenzo[a,d][1,4]cycloheptadiene-5-one.

The compound 5-(3'-bromopropylidene)dibenzo[a,d][1,4]cycloheptadiene is reacted with a substantially equimolar amount of 4-phenyl-4-carbethoxypiperidine. (The latter compound is described by Thorp and Walton in J. Chem. Soc. 1948, at page 559.)

The reaction is preferably carried out by bringing the two compounds, in substantially equimolar preparations, into contact in an inert solvent such as dry benzene and in the presence of an alkaline condensing agent, such as triethylamine. The presence of a substantially equimolar amount of the alkaline condensing agent is advantageous. Heating is desirable, preferably heating to the temperature of reflux of the mixture.

The reaction mixture is allowed to cool and triethylamine hydrobromide, formed as a byproduct, is then removed by filtration or by other means of separation. Evaporation off of the inert solvent results in isolation of the desired chemical compounds, 5-[3'-(4-phenyl-4-carbethoxypiperidino)propylidene]dibenzo[a,d][1,4] - cycloheptadiene. It may be purified by treatment, preferably in ether solution, with carbon dioxide which results in precipitation of any unreacted 4-phenyl-4-carbethoxypiperidine. This unreacted material may be readily removed by filtration.

The purified base may then be reacted in a conventional manner with a pharmacologically acceptable acid to form the corresponding acid addition salt. For example, the hydrochloride salt may be obtained by treating an ethereal solution of the free base with a slight excess of dry, gaseous hydrogen chloride.

The chemical reactions described may be indicated diagrammatically as follows:

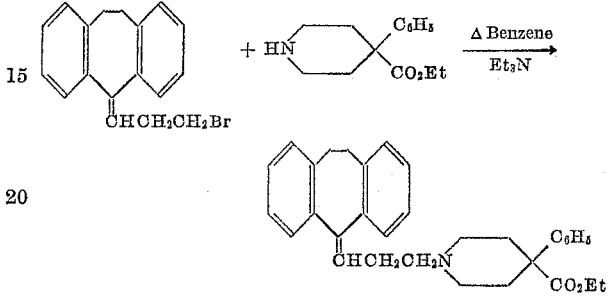

*Example*

4-phenyl-4-carbethoxypiperidine, B.P. 122° C. (0.2 mm.) $n_D^{25}$ 1.5278 was prepared in 64% yield from 4-phenyl-4-carboxy-1-p-tosylpiperidine as described by Thorp and Walton [J. Chem. Soc., 1948, p. 559]. It was necessary to store and handle the material in a nitrogen atmosphere.

A solution of the piperidine (6.5 g., 0.028 mole), triethylamine (3.2 g., 0.032 mole) and 5-(3'-bromopropylidene)dibenzo[a,d][1,4]cycloheptadiene (10.0 g., 0.032 mole) in dry benzene (50 ml.) was heated under reflux for eighteen hours. After cooling, the precipitate was removed by filtration and the solution was evaporated to dryness. The residual oil (14.7 g., free base characterized by its U.V. spectrum, λ max. 238 mμ, ε=16,100) was taken up in dry ether, the solution treated with gaseous carbon dioxide to remove any of the starting piperidine, and the filtered solution was treated with a slight excess of gaseous hydrogen chloride. The resulting salt was collected and recrystallized from isopropanol or preferably a mixture of acetonitrile and nitromethane to furnish a sample of 5-[3'(4-phenyl-4-carbethoxypiperidino)propylidene]dibenzo[a,d][1,4]cycloheptadiene hydrochloride of M.P. 205–206° C.

Found: C, 76.14; H, 7.23; Cl, 7.55%.
$C_{32}H_{36}ClNO_2$ req: C, 76.54; H, 7.23; Cl, 7.06%.

We claim:
1. A compound selected from the group which consists of 5-[3'-(4-phenyl-4-carbethoxypiperidino)propylidene]dibenzo[a,d][1,4]cycloheptadiene and its hydrochloride.
2. 5-[3'-(4-phenyl-4-carbethoxypiperidino)propylidene]dibenzo[a,d][1,4]cycloheptadiene.
3. 5-[3'-(4-phenyl-4-carbethoxypiperidino)propylidene]dibenzo[a,d][1,4]cycloheptadiene hydrochloride.
4. The process of preparing 5-[3'-(4-phenyl-4-carbethoxypiperidino)propylidene]dibenzo[a,d][1,4]cycloheptadiene which comprises bringing together, at an elevated temperature, and in an inert solvent, 4-phenyl-4-carbethoxypiperidine and 5 - (3'-bromopropylidene)dibenzo[a,d][1,4]cycloheptadiene, said reactants being heated in the presence of an alkaline condensing agent; cooling the reaction mixture; removing solid byproducts; and evaporating off said inert solvent, thereby securing said desired product.

No references cited.